(12) United States Patent
Verbeek et al.

(10) Patent No.: US 10,895,624 B2
(45) Date of Patent: *Jan. 19, 2021

(54) DISTINGUISHING DEVICES HAVING POSITIONS AND DIRECTIONS

(71) Applicant: SIGNIFY HOLDING B.V., Eindhoven (NL)

(72) Inventors: Petrus Antonius Verbeek, Deurne (NL); Biju Kumar Sreedharan Nair, Veldhoven (NL); Cornelis Antonius Verbakel, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 307 days.

This patent is subject to a terminal disclaimer.

(21) Appl. No.: 15/778,849

(22) PCT Filed: Nov. 16, 2016

(86) PCT No.: PCT/EP2016/077793
§ 371 (c)(1),
(2) Date: May 24, 2018

(87) PCT Pub. No.: WO2017/093017
PCT Pub. Date: Jun. 8, 2017

(65) Prior Publication Data
US 2018/0348330 A1 Dec. 6, 2018

(30) Foreign Application Priority Data
Nov. 30, 2015 (EP) ..................................... 15197014

(51) Int. Cl.
*G01S 3/786* (2006.01)
*G01S 19/14* (2010.01)
(Continued)

(52) U.S. Cl.
CPC ............ *G01S 3/7861* (2013.01); *G01S 3/783* (2013.01); *G01S 19/14* (2013.01); *G01S 19/48* (2013.01);
(Continued)

(58) Field of Classification Search
CPC ........ G01S 3/7861; G01S 3/786; G01S 3/783; G01S 3/782; G01S 3/781; G01S 3/78;
(Continued)

(56) References Cited

U.S. PATENT DOCUMENTS 3,918,814 A 11/1975 Weiser
4,320,288 A * 3/1982 Schlarlack ............ G01S 3/7861
250/203.4
(Continued)

FOREIGN PATENT DOCUMENTS

CA 2639015 A1 2/2010
DE 102006059549 A1 7/2007
(Continued)

*Primary Examiner* — John R Lee
(74) *Attorney, Agent, or Firm* — Daniel J. Piotrowski

(57) ABSTRACT

Methods for distinguishing devices (1, 2) receive position information from position sensors (13, 23) defining positions of the devices (1, 2), and receive direction information from direction sensors (14, 24) defining directions of the devices (1, 2), and analyze the direction information. The devices (1, 2) can be distinguished from each other, even in case they are located closer to each other than the accuracies of their position sensors (13, 23). First devices (1) comprise first drivers (11) for driving first loads (15), and first controllers (12) for controlling the first drivers (11) and for receiving first position signals from first position sensors (13) and for receiving first direction signals from first direction sensors (14). The first direction sensors (14) may comprise first light detectors (16). Apparatuses (3) may commission the devices (1, 2) and may comprise receivers (31) for receiving the position information and the direction
(Continued)

information and analyzers (32) for analyzing the direction information to distinguish the devices (1, 2).

10 Claims, 6 Drawing Sheets

(51) Int. Cl.
*G01S 19/48* (2010.01)
*G01S 19/51* (2010.01)
*G01S 3/783* (2006.01)
*H05B 47/11* (2020.01)
*H02J 4/00* (2006.01)
*H05B 47/19* (2020.01)

(52) U.S. Cl.
CPC ............... *G01S 19/51* (2013.01); *H02J 4/00* (2013.01); *H05B 47/11* (2020.01); *H05B 47/19* (2020.01)

(58) Field of Classification Search
CPC .......... G01S 19/14; G01S 19/13; G01S 19/38; G01S 19/48; G01S 19/51; G01S 19/42; G01S 19/39; G01S 13/74; G01S 5/04; H02J 4/00; H05B 37/0218; H05B 37/0272; H05B 37/0245; H05B 37/0209; H05B 47/11; H05B 47/19
See application file for complete search history.

(56) References Cited

U.S. PATENT DOCUMENTS

| | | | |
|---|---|---|---|
| 5,483,060 A | 1/1996 | Sugiura et al. | |
| 6,043,778 A * | 3/2000 | Froeberg | G01C 21/28 342/357.36 |
| 7,566,858 B2 * | 7/2009 | Hotelling | G08C 23/04 250/208.2 |
| 8,102,365 B2 * | 1/2012 | Alten | G06F 3/0304 345/156 |
| 8,351,546 B2 * | 1/2013 | Vitek | G01C 9/00 375/316 |
| 8,433,759 B2 * | 4/2013 | Styles | G06F 3/017 455/456.3 |
| 8,530,817 B1 | 9/2013 | Smith | |
| 8,593,398 B2 * | 11/2013 | Ollila | G06F 3/04883 345/156 |
| 9,255,981 B2 * | 2/2016 | Ning | G01S 3/7861 |
| 9,542,841 B2 * | 1/2017 | De Oliveira | G08G 1/096783 |
| 10,613,186 B2 * | 4/2020 | Verbeek | G01S 19/39 |
| 2005/0027487 A1 * | 2/2005 | Iyer | G06Q 30/02 702/185 |
| 2005/0274879 A1 | 12/2005 | Osaragi et al. | |
| 2007/0152804 A1 | 7/2007 | Breed et al. | |
| 2007/0178967 A1 * | 8/2007 | Rosenberg | A63B 43/00 463/39 |
| 2008/0236568 A1 | 10/2008 | Hickerson et al. | |
| 2008/0238771 A1 * | 10/2008 | Katayama | G01S 19/48 342/357.31 |
| 2009/0054077 A1 * | 2/2009 | Gauthier | G06F 3/0338 455/456.1 |
| 2009/0056700 A1 | 3/2009 | Lin et al. | |
| 2011/0043381 A1 * | 2/2011 | Sirota | G08G 1/0175 340/937 |
| 2011/0274000 A1 * | 11/2011 | King | H04W 48/20 370/252 |
| 2012/0176491 A1 | 7/2012 | Garin et al. | |
| 2012/0265482 A1 * | 10/2012 | Grokop | G06F 1/1686 702/141 |
| 2012/0293075 A1 * | 11/2012 | Engelen | H05B 47/19 315/151 |
| 2013/0057158 A1 | 3/2013 | Josefowicz et al. | |
| 2013/0103200 A1 * | 4/2013 | Tucker | G01C 21/20 700/275 |
| 2015/0084520 A1 * | 3/2015 | Reed | H05B 47/105 315/152 |
| 2015/0115805 A1 * | 4/2015 | Henig | H05B 47/105 315/152 |
| 2015/0136944 A1 * | 5/2015 | Segev | G01S 3/7861 250/203.4 |
| 2015/0173154 A1 | 6/2015 | Faulkner | |
| 2015/0181388 A1 * | 6/2015 | Smith | H04W 36/08 455/426.1 |
| 2015/0194054 A1 * | 7/2015 | Peterson | H04W 4/80 701/119 |
| 2016/0057581 A1 * | 2/2016 | Khosravy | G06Q 30/0241 455/456.3 |
| 2016/0086148 A1 * | 3/2016 | Katsumura | G06Q 20/208 705/23 |
| 2016/0135007 A1 * | 5/2016 | Persson | H04W 4/027 455/456.2 |
| 2016/0227634 A1 * | 8/2016 | Engelen | G05D 1/0234 |
| 2016/0260328 A1 * | 9/2016 | Mishra | G01S 5/0072 |
| 2016/0282468 A1 * | 9/2016 | Gruver | G01S 17/931 |
| 2016/0311633 A1 * | 10/2016 | Enenkel | B64F 1/368 |
| 2017/0127497 A1 * | 5/2017 | Baek | H05B 45/24 |
| 2017/0153311 A1 * | 6/2017 | Verbeek | G01S 19/48 |
| 2017/0176208 A1 * | 6/2017 | Chung | H04N 5/23293 |
| 2018/0249297 A1 * | 8/2018 | Taylor | G01S 1/06 |
| 2018/0348330 A1 * | 12/2018 | Verbeek | G01S 19/39 |

FOREIGN PATENT DOCUMENTS

| | | |
|---|---|---|
| EP | 0733912 A2 | 9/1996 |
| EP | 2224210 A2 | 9/2010 |
| GB | 2368905 A | 5/2002 |
| RU | 2327952 C2 | 2/2008 |
| WO | 2008107718 A1 | 9/2008 |

* cited by examiner

DISTINGUISHING DEVICES HAVING POSITIONS AND DIRECTIONS

CROSS-REFERENCE TO PRIOR APPLICATIONS

This application is the U.S. National Phase application under 35 U.S.C. § 371 of International Application No. PCT/EP2016/077793, filed on Nov. 16, 2016 which claims the benefit of European Patent Application No. 15197014.2, filed on Nov. 30, 2015. These applications are hereby incorporated by reference herein.

FIELD OF THE INVENTION

The invention relates to a method for distinguishing first and second devices from each other, for example in a commissioning procedure. The invention further relates to a first device, to a system and to an apparatus. Examples of such a first device are lighting devices and non-lighting devices, and examples of such an apparatus are commissioning apparatuses.

BACKGROUND OF THE INVENTION

It is of common general knowledge to provide devices with position sensors, to be able to distinguish the devices, for example in commissioning procedures. However, sometimes, two or more devices are located closer to each other than the accuracies of their position sensors.

SUMMARY OF THE INVENTION

It is an object of the invention to provide an improved method. Further objects of the invention are to provide an improved device, an improved system and an improved apparatus.

According to a first aspect, a method is provided for distinguishing first and second devices from each other.

Such a method may comprise a step of receiving first position information from a first position sensor, which first position information is configured to define a first position of the first device, and a step of receiving second position information from a second position sensor, which second position information is configured to define a second position of the second device.

Such a method may further comprise a step of receiving first direction information from a first direction sensor, which first direction information is configured to define a first direction of the first device, and a step of receiving second direction information from a second direction sensor, which second direction information is configured to define a second direction of the second device.

Such a method may further comprise a step of analyzing the first and second direction information.

So, the first position information originates from the first position sensor and defines the first position of the first device. The second position information originates from the second position sensor and defines the second position of the second device.

The first direction information originates from the first direction sensor and defines the first direction of the first device. The second direction information originates from the second direction sensor and defines the second direction of the second device. The first and second devices may be mutually different directions.

By analyzing the first and second direction information, it will become clear that the first and second devices have said mutually different directions. As a result, the first and second devices can be distinguished from each other, even in case they are located closer to each other than the accuracies of their position sensors.

An embodiment of the method is defined, wherein the defined first and second positions differ insufficiently to distinguish the first and second devices. Especially in case the defined first and second positions differ insufficiently from each other to distinguish the first and second devices from each other, the first and second direction information might be used to distinguish the first and second devices. However, even in case the defined first and second positions differ sufficiently from each other, it might still be interesting to introduce and/or use the first and second direction information to distinguish the first and second devices, for example to control the results from the first and second position sensors, or for example to distinguish the first and second devices in a directional way.

According to a second aspect, a first device is provided for driving a first load like for example a first light-emitting-element or a first non-lighting-element.

Such a first device may comprise a first driver configured to be coupled to the first load and configured to drive the first load.

Such a first device may further comprise a first controller coupled to the first driver and configured to control the first driver, which first controller is further configured to receive a first position signal from a first position sensor, which first position signal is configured to define a first position of the first device, and which first controller is further configured to receive a first direction signal from a first direction sensor, which first direction signal is configured to define a first direction of the first device.

So, the first device comprises a first driver that can be coupled to a first load. The first driver may drive the first load.

The first device further comprises a first controller coupled to the first driver. The first controller may control the first driver, and may receive a first position signal from the first position sensor, which first position signal defines a first position of the first device, and may receive a first direction signal from the first direction sensor, which first direction signal defines a first direction of the first device.

As a result, the first device can be distinguished from a second device, even in case they are located closer to each other than the accuracies of their position sensors.

An embodiment of the first device is defined, wherein the first controller is configured to process the first direction signal, or wherein the first controller is configured to process the first direction signal and a second direction signal coming from a second device, or wherein the first controller is configured to forward the first direction signal to a second device or to a third device or to an apparatus.

The first controller may process the first direction signal, for example to derive the first direction from the first direction signal. The first direction may then be forwarded to an apparatus such as a commissioning apparatus. The first controller may process the first direction signal and a second direction signal coming from a second device, for example to derive the first and second directions from the first and second direction signals. The first and second directions may then be forwarded to an apparatus such as a commissioning apparatus. The first controller may forward the first direction signal to a second device located at a relatively short distance from the first device or to a third device located at a relatively large distance from the first device or to an apparatus such as a commissioning apparatus. The second device or the third device or the apparatus may then derive the first direction from the first direction signal etc.

An embodiment of the first device is defined, further comprising the first position sensor coupled to the first controller. Preferably, the first device may comprise the first position sensor, whereby it is not to be excluded that the first device and the first position sensor are produced separately from each other and sold separately from each other and then combined.

The first position sensor may comprise a first Global Positioning System sensor or any other kind of first position sensor.

An embodiment of the first device is defined, further comprising the first direction sensor coupled to the first controller. Preferably, the first device may comprise the first direction sensor, whereby it is not to be excluded that the first device and the first direction sensor are produced separately from each other and sold separately from each other and then combined.

An embodiment of the first device is defined, wherein the first direction sensor comprises a first light detector configured to detect incoming light from the sun, which first light detector comprises a first multiple field light detector or another kind of first light detector. Preferably, the first direction sensor may comprise a first light detector. Such a first light detector may detect incoming light from the sun, and may comprise a first multiple field light detector, such as a quad cell, or another kind of first light detector.

U.S. Pat. No. 5,483,060 discloses an optical position sensor and isolation sensor using this position sensor. U.S. Pat. No. 5,483,060 is not related to distinguishing first and second devices from each other.

An embodiment of the first device is defined, wherein the first direction sensor further comprises a first shadow producer configured to produce shadow on a part of the first light detector. Preferably, the first direction sensor may further comprise a first shadow producer. Such a first shadow producer may produce shadow on a part of the first light detector. The shadow on one part of the first light detector and/or the light on another part of the first light detector will be indicative for a direction of the first light detector (and the first device) with respect to the sun for a given position of the sun as defined by the date and the time.

An embodiment of the first device is defined, further comprising the first load that comprises a first light-emitting-element or a first non-lighting-element. Preferably, the first device may further comprise the first load, whereby it is not to be excluded that the first device and the first load are produced separately from each other and sold separately from each other and then combined. The first load may comprise a first light-emitting-element, such as a light emitting diode circuit that comprises one or more light emitting diodes, or a first non-lighting-element.

According to a third aspect, a system is provided comprising the first device as defined above and further comprising a second device for driving a second load.

Such a second device may comprise a second driver configured to be coupled to the second load and configured to drive the second load.

Such a second device may further comprise a second controller coupled to the second driver and configured to control the second driver, which second controller is further configured to receive a second position signal from a second position sensor, which second position signal is configured to define a second position of the second device, and which second controller is further configured to receive a second direction signal from a second direction sensor, which second direction signal is configured to define a second direction of the second device.

So, the system further comprises the second device. The second device comprises a second driver that can be coupled to a second load. The second driver may drive the second load.

The second device further comprises a second controller coupled to the second driver. The second controller may control the second driver, and may receive a second position signal from a second position sensor, which second position signal defines a second position of the second device, and may receive a second direction signal from a second direction sensor, which second direction signal defines a second direction of the second device. The first and second directions may be mutually different directions.

As a result, the first and second devices can be distinguished from each other, even in case they are located closer to each other than the accuracies of their position sensors.

An embodiment of the system is defined, wherein the first controller is configured to process the first direction signal or wherein the first controller is configured to process the first direction signal and the second direction signal or wherein the first controller is configured to forward the first direction signal to the second device or to a third device or to an apparatus, and wherein the second controller is configured to process the second direction signal or wherein the second controller is configured to process the first direction signal and the second direction signal or wherein the second controller is configured to forward the second direction signal to the first device or to a fourth device or to an apparatus.

The first controller may process the first direction signal, for example to derive the first direction from the first direction signal. The first direction may then be forwarded to an apparatus such as a commissioning apparatus. The first controller may process the first direction signal and a second direction signal coming from a second device, for example to derive the first and second directions from the first and second direction signals. The first and second directions may then be forwarded to an apparatus such as a commissioning apparatus. The first controller may forward the first direction signal to a second device located at a relatively short distance from the first device or to a third device located at a relatively large distance from the first device or to an apparatus such as a commissioning apparatus. The second device or the third device or the apparatus may then derive the first direction from the first direction signal etc.

The second controller may process the second direction signal, for example to derive the second direction from the second direction signal. The second direction may then be forwarded to an apparatus such as a commissioning apparatus. The second controller may process the first direction signal coming from the first device and the second direction signal, for example to derive the first and second directions from the first and second direction signals. The first and second directions may then be forwarded to an apparatus such as a commissioning apparatus. The second controller may forward the second direction signal to the first device located at a relatively short distance from the second device or to a fourth device located at a relatively large distance from the second device or to an apparatus such as a commissioning apparatus. The first device or the fourth device or the apparatus may then derive the second direction from the second direction signal etc.

The third and fourth devices may be the same device or may be different devices.

An embodiment of the system is defined, wherein the first device further comprises the first direction sensor coupled to the first controller, and wherein the second device further comprises the second direction sensor coupled to the second controller, and wherein the first and second direction signals are different from each other.

Preferably, the first device may comprise the first direction sensor, whereby it is not to be excluded that the first device and the first direction sensor are produced separately from each other and sold separately from each other and then combined.

Preferably, the second device may comprise the second direction sensor, whereby it is not to be excluded that the second device and the second direction sensor are produced separately from each other and sold separately from each other and then combined. The first and second direction signals are different from each other to allow the first and second devices to be distinguished from each other.

An embodiment of the system is defined, wherein the first direction sensor comprises a first light detector configured to detect incoming light from the sun, which first light detector comprises a first multiple field light detector or another kind of first light detector, and wherein the second direction sensor comprises a second light detector configured to detect the incoming light from the sun, which second light detector comprises a second multiple field light detector or another kind of second light detector.

Preferably, the first direction sensor may comprise a first light detector. Such a first light detector may detect incoming light from the sun, and may comprise a first multiple field light detector, such as a quad cell, or another kind of first light detector.

Preferably, the second direction sensor may comprise a second light detector. Such a second light detector may detect incoming light from the sun, and may comprise a second multiple field light detector, such as a quad cell, or another kind of second light detector.

An embodiment of the system is defined, wherein the first direction sensor further comprises a first shadow producer configured to produce shadow on a part of the first light detector, and wherein the second direction sensor further comprises a second shadow producer configured to produce shadow on a part of the second light detector.

Preferably, the first direction sensor may further comprise a first shadow producer. Such a first shadow producer may produce shadow on a part of the first light detector. The shadow on one part of the first light detector and/or the light on another part of the first light detector will be indicative for a direction of the first light detector (and the first device) with respect to the sun for a given position of the sun as defined by the date and the time.

Preferably, the second direction sensor may further comprise a second shadow producer. Such a second shadow producer may produce shadow on a part of the second light detector. The shadow on one part of the second light detector and/or the light on another part of the second light detector will be indicative for a direction of the second light detector (and the second device) with respect to the sun for a given position of the sun as defined by the date and the time.

According to a fourth aspect, an apparatus is provided. Such an apparatus may be configured to commission first and second devices and may be configured to distinguish the first and second devices from each other.

Such an apparatus may comprise a receiver configured to receive first position information from a first position sensor and configured to receive second position information from a second position sensor and configured to receive first direction information from a first direction sensor and configured to receive second direction information from a second direction sensor, which first position information is configured to define a first position of the first device, which second position information is configured to define a second position of the second device, which first direction information is configured to define a first direction of the first device, which second direction information is configured to define a second direction of the second device.

Such an apparatus may further comprise an analyzer configured to analyze the first and second direction information.

So, the apparatus may commission first and second devices and/or may distinguish the first and second devices from each other.

The apparatus comprises a receiver. The receiver may receive first position information from a first position sensor, possibly via a first device, and may receive second position information from a second position sensor, possibly via a second device, and may receive first direction information from a first direction sensor, possibly via a first device, and may receive second direction information from a second direction sensor, possibly via a second device. The first position information may define a first position of the first device, the second position information may define a second position of the second device, the first direction information may define a first direction of the first device, the second direction information may define a second direction of the second device. The first and second directions may be mutually different directions.

The apparatus further comprises an analyzer. The analyzer may analyze the first and second direction information, to distinguish the first and second devices from each other.

Embodiments of the apparatus may correspond with the embodiments of the method and of the first device and of the system. Embodiments of the method may correspond with the embodiments of the first device and of the system. Embodiments of the system may correspond with the embodiments of the method and of the first device.

Other kinds of direction sensors such as for example cameras and compasses and wind detectors are not to be excluded.

A basic idea is that, instead of first and second position information, first and second direction information may be used to distinguish first and second devices from each other.

A problem to provide an improved method has been solved. A further advantage is that commissioning may be improved as well.

These and other aspects of the invention will be apparent from and elucidated with reference to the embodiments described hereinafter.

DETAILED DESCRIPTION OF EMBODIMENTS

Figure 1:
FIG. 1 shows a prior art street lamp with devices.

In the FIG. 1, a prior art street lamp with devices is shown. A first device for example illuminates a north lane, and a second device for example illuminates a south lane. Both devices are here according to this exemplary embodiment mounted on one and the same pole. Alternatively they may each be mounted on their own pole.

Figure 2:
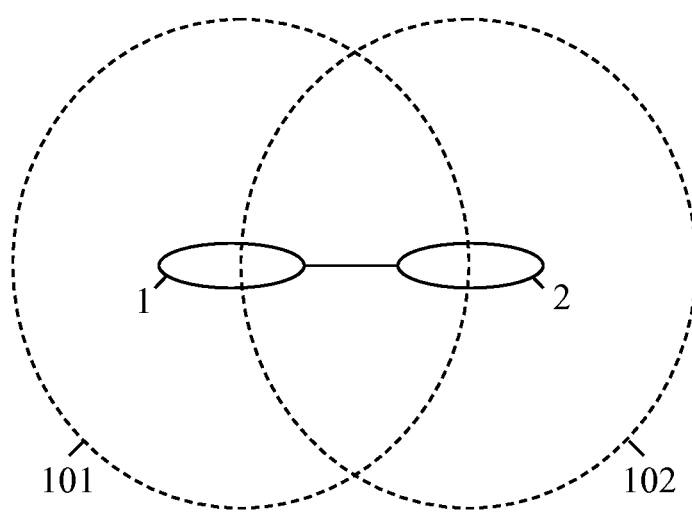
FIG. 2 shows a prior art situation with devices.

In the FIG. 2, a prior art situation with devices is shown. The first device 1 and the second device 2 each comprise a position sensor not shown here that has an accuracy as indicated by the circles 101 and 102. Owing to the fact that these circles 101 and 102 have an overlapping part, results from the position sensors located in this overlapping part cannot be allocated unambiguously to one of the position sensors.

Figure 3:
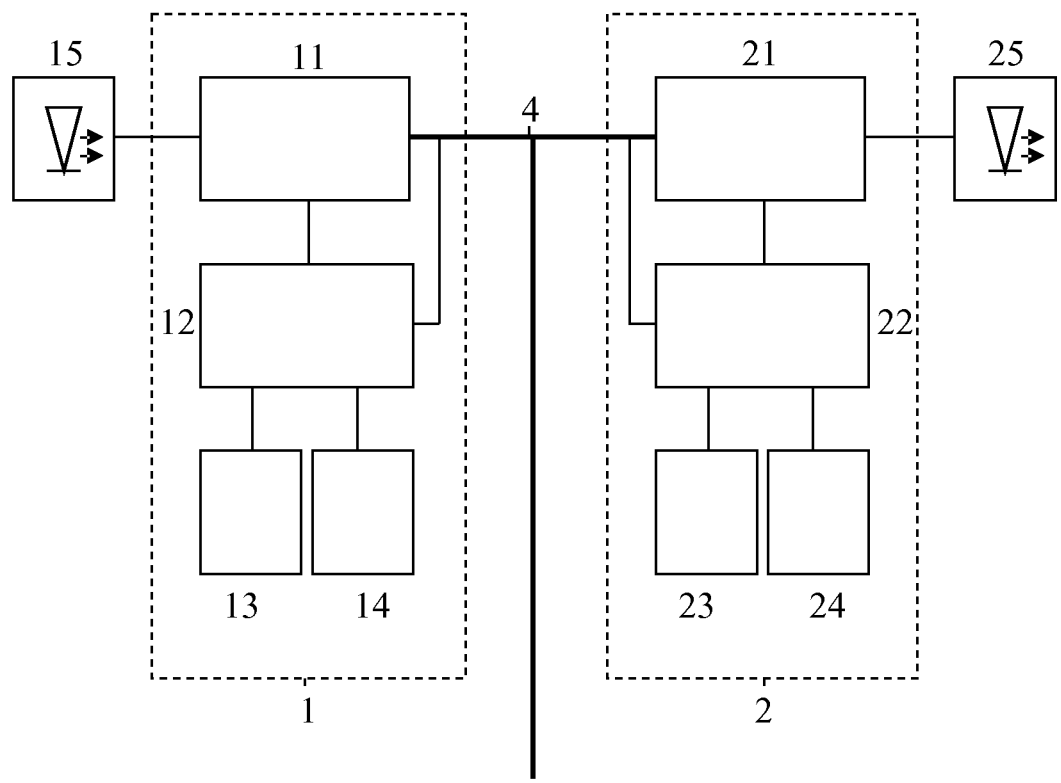
FIG. 3 shows a system with devices.

In the FIG. 3, a system with devices is shown. The first device 1 comprises a first driver 11 coupled to a power cable 4 and to a first load 15 for driving the first load 15. The first device 1 further comprises a first controller 12 coupled to the power cable 4 and to the first driver 11 for controlling the first driver 11. The first controller 12 is further coupled to a first position sensor 13 for receiving a first position signal from the first position sensor 13, which first position signal defines a first position of the first device 1. The first controller 12 is further coupled to a first direction sensor 14 for receiving a first direction signal from the first direction sensor 14, which first direction signal defines a first direction of the first device 1.

The second device 2 comprises a second driver 21 coupled to the power cable 4 and to a second load 25 for driving the second load 25. The second device 2 further comprises a second controller 22 coupled to the power cable 4 and to the second driver 21 for controlling the second driver 21. The second controller 22 is further coupled to a second position sensor 23 for receiving a second position signal from the second position sensor 23, which second position signal defines a second position of the second device 2. The second controller 22 is further coupled to a second direction sensor 24 for receiving a second direction signal from the second direction sensor 24, which second direction signal defines a second direction of the second device 2.

In the FIG. 3, the first and second loads 15 and 25 comprise first and second light-emitting-elements here in the form of light emitting diode circuits, but other kinds of light-emitting-elements and non-lighting-elements are not to be excluded. The first and second loads 15 and 25 are located outside the first and second devices 1 and 2, but alternatively they may form part of the first and second devices 1 and 2. The first and second position sensors 13 and 23 form part of the first and second devices 1 and 2, but alternatively they may be located outside the first and second devices 1 and 2. The first and second direction sensors 14 and 24 form part of the first and second devices 1 and 2, but alternatively they may be located outside the first and second devices 1 and 2.

Figure 4:
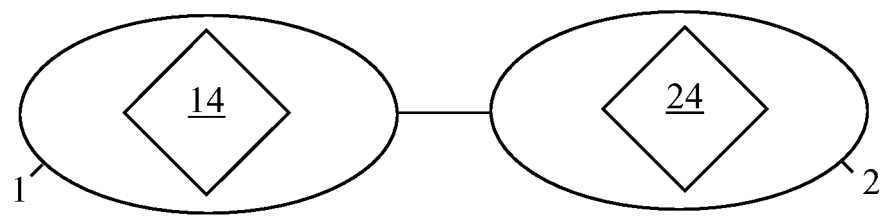
FIG. 4 shows devices with direction sensors.

In the FIG. 4, devices with direction sensors are shown. The first device 1 has been combined with the first direction sensor 14, and the second device 2 has been combined with the second direction sensor 24. Here according to this exemplary embodiment a top view of the first and second devices 1 and 2 is shown, whereby the first and second devices 1 and 2 for example illuminate lanes located below the first and second devices 1 and 2 and whereby the first and second direction sensors 14 and 24 have been installed on top of the first and second devices 1 and 2, but other combinations are not to be excluded.

Figure 5:
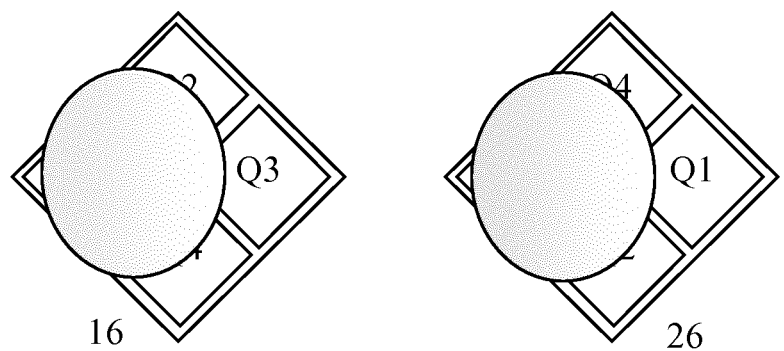
FIG. 5 shows light detectors with shadows.

In the FIG. 5, light detectors with shadows are shown. The first light detector 16 forms part of the first direction sensor 14 and detects incoming light from the sun. This first light detector 16 comprises a first multiple field light detector with four fields Q1, Q2, Q3 and Q4, but more or fewer fields and other kinds of first light detectors are not to be excluded. The second light detector 26 forms part of the second direction sensor 24 and detects incoming light from the sun. This second light detector 26 comprises a second multiple field light detector with four fields Q1, Q2, Q3 and Q4, but more or fewer fields and other kinds of second light detectors are not to be excluded.

Figure 7:
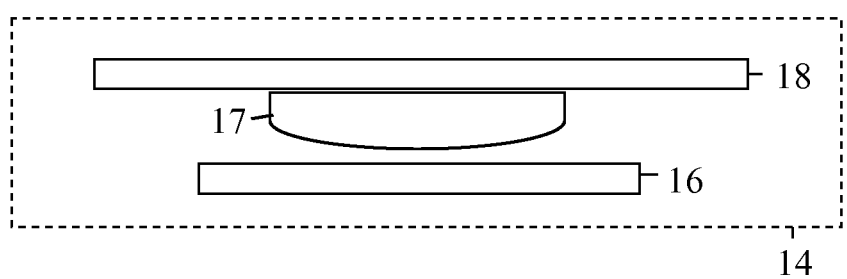
FIG. 7 shows an embodiment of a direction sensor.

In the FIG. 5, the sun is located at the right side of the first and second direction sensors 16 and 26, therefore the shadows as indicated by the circles and resulting from shadow producers as discussed at the hand of the FIG. 7 are located a bit to the left. As a result, of the first light detector 16, the field Q1 is located in the shadow to a large extent, the fields Q2 and Q4 are located in the shadow to a medium extent, and the field Q3 is located in the shadow to a small extent. Similarly, of the second light detector 26, the field Q3 is located in the shadow to a large extent, the fields Q2 and Q4 are located in the shadow to a medium extent, and the field Q1 is located in the shadow to a small extent.

Figure 6:
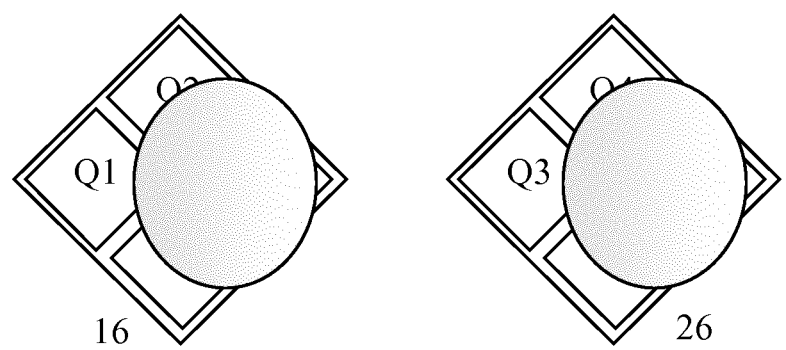
FIG. 6 shows light detectors with other shadows.

In the FIG. 6, light detectors with other shadows are shown. Again, just like for the FIG. 5, the first light detector 16 comprises a first multiple field light detector with four fields Q1, Q2, Q3 and Q4, but more or fewer fields and other kinds of first light detectors are not to be excluded, and the second light detector 26 comprises a second multiple field light detector with four fields Q1, Q2, Q3 and Q4, but more or fewer fields and other kinds of second light detectors are not to be excluded.

In the FIG. 6, the sun is located at the left side of the first and second direction sensors 16 and 26, therefore the shadows as indicated by the circles and resulting from shadow producers as discussed at the hand of the FIG. 7 are located a bit to the right. As a result, of the first light detector 16, the field Q3 is located in the shadow to a large extent, the fields Q2 and Q4 are located in the shadow to a medium extent, and the field Q1 is located in the shadow to a small extent. Similarly, of the second light detector 26, the field Q1 is located in the shadow to a large extent, the fields Q2 and Q4 are located in the shadow to a medium extent, and the field Q3 is located in the shadow to a small extent.

In the FIG. 7, an embodiment of a direction sensor is shown. The first direction sensor 14 comprises a first light detector 16 as for example shown in the FIGS. 5 and 6, and further comprises a shadow producer 17 and an optical window 18. Through the optical window 18, the incoming light from the sun reaches those parts of the light detector 16 that are not blocked by the shadow producer 17. For the second direction sensor 24 as shown in the FIG. 4, a similar embodiment may be present.

Other kinds of light detectors, such as for example 3D light detectors that can detect incoming light angles, and such as for example cameras, are not to be excluded. Other kinds of shadow producers are not to be excluded. In certain cases the shadow producers might not be necessary. Other kinds of direction sensors, such as for example wind detectors and compasses, are not to be excluded too.

In view of the FIG. 4-7, it must be noted that each device and its direction sensor should have a predefined relationship in construction. In the FIG. 4-6, the field Q1 of the first light detector 16 is—after installment—located closer to an open end of the first device 1, and the field Q3 is—after installment—located closer to the other end of the first device 1, which other end is located closest to the pole as shown in the FIG. 1. Similarly, the field Q1 of the second light detector 26 is—after installment—located closer to an open end of the second device 2, and the field Q3 is—after installment—located closer to the other end of the second device 2, which other end is located closest to the pole as shown in the FIG. 1.

By using the same predefined relationship for each combination of a device and its direction sensor, different directions of different devices can be determined and such different devices located in mutually different directions can be unambiguously distinguished from each other. In this case, absolute directions of the direction sensors are determined, and as a result absolute directions of the devices are determined (owing to the fact that they correspond with the absolute directions of the direction sensors due to said same predefined relationship), and the devices to be distinguished need to have mutually different directions.

Alternatively, by using mutually different predefined relationships for combinations of devices and direction sensors, it is even possible to unambiguously distinguish different devices located in a same direction. As an example only, one (west) device may be combined with a light detector as shown in the left parts of the FIGS. 5 and 6, and another (east) device may be combined with a light detector that is, compared to the one shown in the left parts of the FIGS. 5 and 6, turned by for example 90 degrees (or any other angle different from 0 degrees). Then, even fully parallel devices (not anti-parallel devices as shown in the FIGS. 1 and 2 but really fully parallel devices) can be unambiguously distinguished from each other as long as said predefined relations ships are known. In this case, absolute directions of the direction sensors are determined, and as a result relative directions of the devices with respect to the absolute directions of the direction sensors are determined (owing to the fact that the predefined relationships are known), and the devices to be distinguished can even have a same direction.

Figure 8:
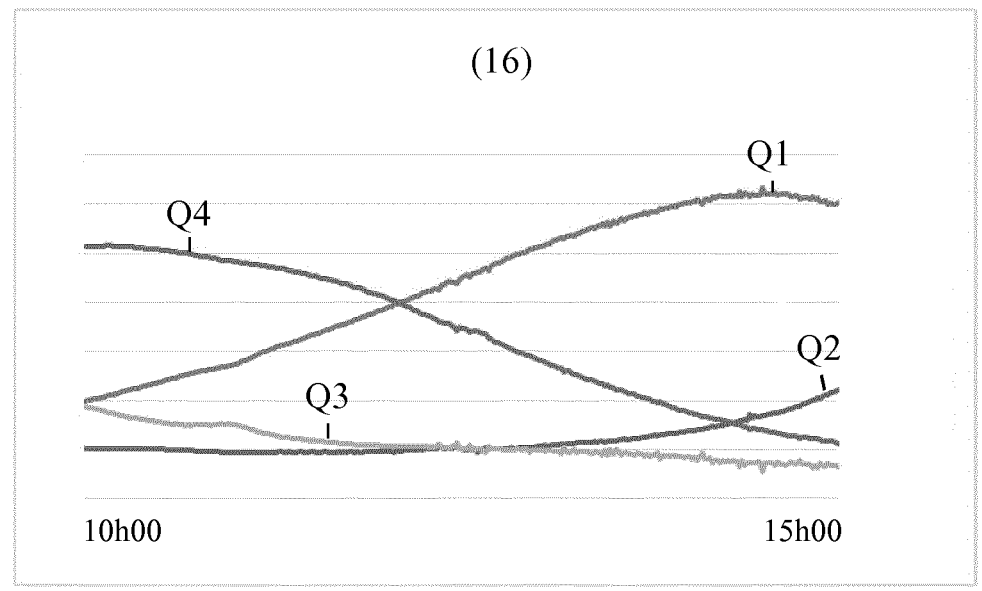
FIG. 8 shows outputs of light detectors.
Figure 8:
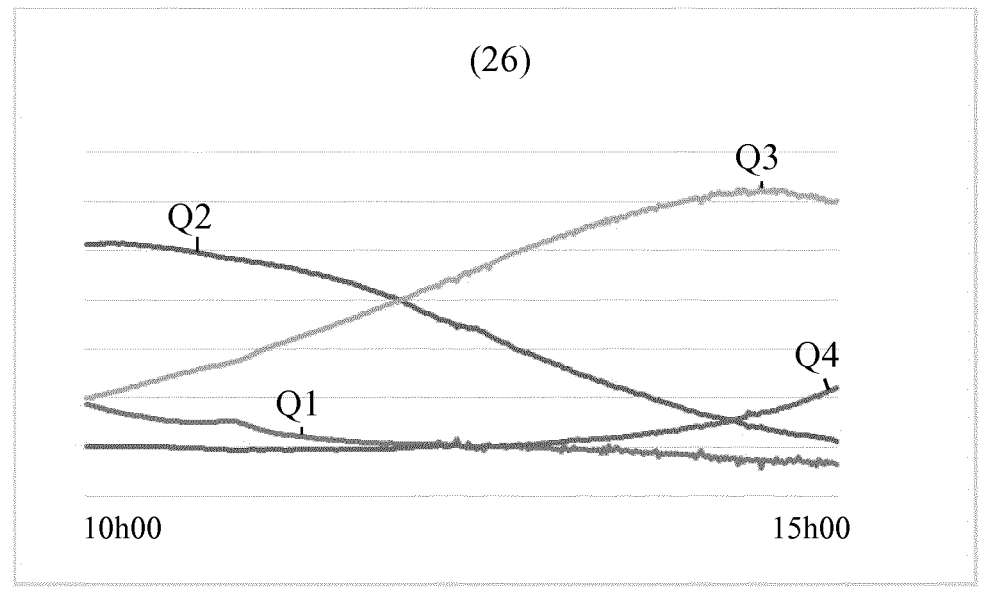

In the FIG. 8, outputs of light detectors are shown. In the upper graph (vertical axis: amplitude, horizontal axis: time of the day) the outputs of the fields Q1-Q4 of the first light detector 16 are shown. From 10 h00 to 15 h00, an output of the field Q1 increases from relatively low to relatively high, an output of the field Q2 stays relatively low, an output of the field Q3 stays relatively low, and an output Q4 decreases from relatively high to relatively low. In the lower graph (vertical axis: amplitude, horizontal axis: time of the day) the outputs of the fields Q1-Q4 of the second light detector 26 are shown. From 10 h00 to 15 h00, an output of the field Q1 stays relatively low, an output of the field Q2 decreases from relatively high to relatively low, an output of the field Q3 increases from relatively low to relatively high, and an output Q4 stays relatively low. Clearly, from the different outputs, the different devices can be distinguished, and their directions can be determined. The FIG. 8 is not related in any way to the shadows shown in the FIGS. 5 and 6.

Figure 9:
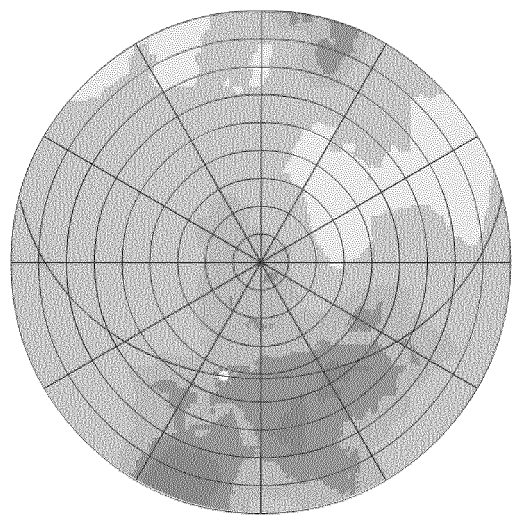
FIG. 9 shows the planet earth and the sun.

In the FIG. 9, the planet earth and the sun are shown, not at the proper scale.

Figure 10:
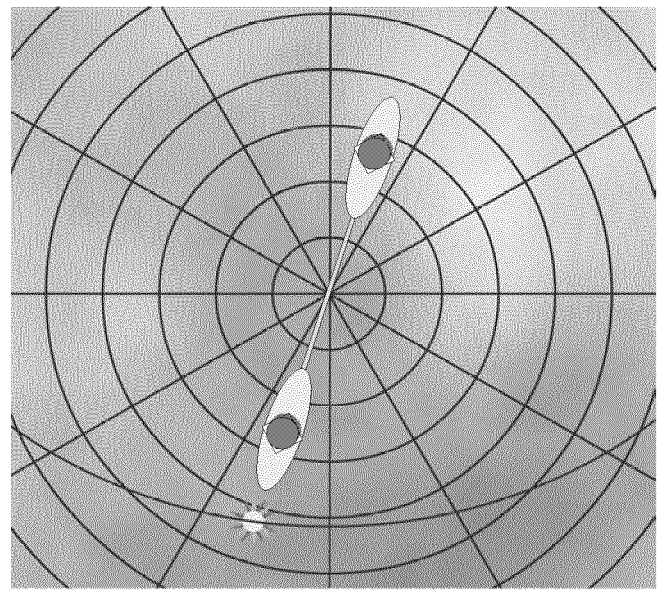
FIG. 10 shows the planet earth and the sun and devices.

In the FIG. 10, the planet earth and the sun and devices are shown, not at the proper scale.

In view of the FIGS. 9 and 10 it must be noted that for a given day of the year and for a given time as expressed in hours and minutes and for a given position on earth as expressed in latitude and longitude the position of the sun is known. Then the shadow produced by the sun is known, for that day, time, and position, given the shape and the dimensions of the shadow producer and its location with respect to the light detector.

Figure 11:
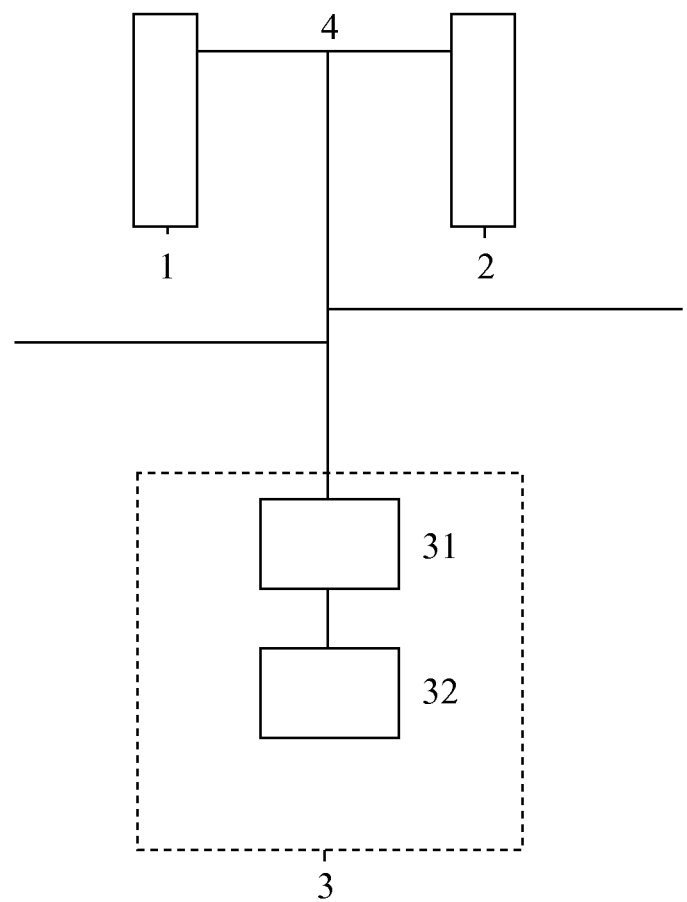
FIG. 11 shows an apparatus.

In the FIG. 11, an apparatus is shown. The apparatus 3 can for example commission the first and second devices 1 and 2 (and many other devices if present) and can distinguish the first and second devices 1 and 2 (and the many other devices if present) from each other. The apparatus 3 comprises a receiver 31 for example for receiving first position information from the first position sensor 13 (possibly via the first device 1) and for example for receiving second position information from the second position sensor 23 (possibly via the second device 2) and for example for receiving first direction information from the first direction sensor 14 (possibly via the first device 1) and for example for receiving second direction information from the second direction sensor 24 (possibly via the second device 2).

In the FIG. 11, the first and second devices 1 and 2 and the apparatus 3 are coupled to the power cable 4, in which case the communication can take place via the power cable 4, but any other wired and/or wireless communication is possible too and not to be excluded.

The first position information defines a first position of the first device 1, the second position information defines a second position of the second device 2, the first direction information defines a first direction of the first device 1 absolutely or relatively, and the second direction information defines a second direction of the second device 2 absolutely or relatively. These first and second directions are different directions in an absolute way or in a relative way, as discussed at the hand of the FIG. 4-7.

The apparatus 3 further comprises an analyzer 32 for analyzing the first and second direction information. Thereto, the analyzer 32 might compare the outputs of the direction sensors with each other. Alternatively, the analyzer 32 might calculate functions of the outputs of the direction sensors and decide at the hand of the results, without having excluded further analyses.

To commission devices, a device 1, 2 provides a temporary or non-temporary identification of itself to the apparatus 3, together with its position information and its direction information. In case the position information defines a sufficiently different position of a device, the direction information does not need to be used. In case the position information defines insufficiently different positions of devices, the direction information needs to be used to distinguish the devices. After distinguishing, a temporary identification may be replaced by a non-temporary identification.

So, a method for distinguishing first and second devices 1 and 2 from each other comprises the steps of receiving first position information from a first position sensor 13, which first position information for example comprises first position coordinates of the first device 1 or first position codes that are to be converted into first position coordinates of the first device 1, receiving second position information from a second position sensor 23, which second position information for example comprises second position coordinates of the second device 2 or second position codes that are to be converted into second position coordinates of the second device 2, receiving first direction information from a first direction sensor 14, which first direction information for example comprises first direction coordinates of the first device 1 or first direction codes that are to be converted into first direction coordinates of the first device 1, receiving second direction information from a second direction sensor 24, which second direction information for example comprises second direction coordinates of the second device 2 or second direction codes that are to be converted into second direction coordinates of the second device 2, which first and second direction coordinates are different coordinates, and analyzing the first and second direction information.

The defined first and second position coordinates may then differ insufficiently to still be able to distinguish the first and second devices 1 and 2.

Such a method may be performed in one or more of the controllers of the devices and/or in the apparatus.

The first position information may be exchanged via a first position signal, the second position information may be exchanged via a second position signal, the first direction information may be exchanged via a first direction signal, and the second direction information may be exchanged via a second direction signal.

To perform the method in a device, a controller may process (analyze) one or more direction signals. Alternatively, the controller may forward one or more direction signals to another controller and/or to the apparatus.

To perform the method in the apparatus, a receiver may receive one or more direction signals and an analyzer may analyze one or more direction signals.

Similarly to the first and second directions, the first and second positions may be absolute positions or relative positions. The first and second position sensors 13 and 23 may each comprise a Global Positioning System sensor or any other kind of position sensor. A controller may comprise any kind of processor or any other kind of controller. An analyzer may comprise any kind of processor or any other kind of analyzer. First and second units can be coupled indirectly via a third unit and can be coupled directly without the third unit being in between.

Summarizing, methods for distinguishing devices 1, 2 receive position information from position sensors 13, 23 defining positions of the devices 1, 2, and receive direction information from direction sensors 14, 24 defining directions of the devices 1, 2, and analyze the direction information. The devices 1, 2 can be distinguished from each other, even in case they are located closer to each other than the accuracies of their position sensors 13, 23. First devices 1 comprise first drivers 11 for driving first loads 15, and first controllers 12 for controlling the first drivers 11 and for receiving first position signals from first position sensors 13 and for receiving first direction signals from first direction sensors 14. The first direction sensors 14 may comprise first light detectors 16. Apparatuses 3 may commission the devices 1, 2 and may comprise receivers 31 for receiving the position information and the direction information and analyzers 32 for analyzing the direction information to distinguish the devices 1, 2.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for distinguishing first and second devices from each other, performed by an apparatus, wherein the first device comprises a first position sensor and a first direction sensor, wherein the second device comprises a second position sensor and a second direction sensor, which method comprises the steps of
   receiving first position information from the first position sensor, which first position information is configured to define a first position of the first device,
   receiving second position information from the second position sensor, which second position information is configured to define a second position defining the position of the second device,
   receiving first direction information from the first direction sensor, which first direction information is configured to define a first direction of the first device,
   receiving second direction information from the second direction sensor, which second direction information is configured to define a second direction of the second device, and
   analyzing the first and second direction information and first and second position for distinguishing first and second devices from each other.

2. The method as defined in claim 1, wherein the first and second positions differ insufficiently to distinguish the first and second devices using only the first and second position.

3. A first device for driving a first load, which first device comprises
   a first driver configured to be coupled to the first load and configured to drive the first load, and
   a first controller coupled to the first driver and configured to control the first driver, which first controller is further configured to receive a first position signal from a first position sensor, which first position signal is configured to define a first position of the first device, and which first controller is further configured to receive a first direction signal from a first direction sensor, which first direction signal is configured to define a first direction of the first device;
   wherein the first controller is configured to forward the first direction signal and the first position to an apparatus for distinguishing the first device and a second device from each other; and
   wherein the first position sensor coupled to the first controller and the first direction sensor coupled to the first controller.

4. The first device as defined in claim 3, wherein the first direction sensor comprises a first light detector configured to detect incoming light from the sun, which first light detector comprises a first multiple field light detector or another kind of first light detector.

5. The first device as defined in claim 4, wherein the first direction sensor further comprises a first shadow producer configured to produce shadow on a part of the first light detector.

6. The first device as defined in claim 3, further comprising the first load that comprises a first light-emitting-element.

7. A system comprising the first device as defined in claim 3 and further comprising a second device for driving a second load, which second device comprises a second driver configured to be coupled to the second load and configured to drive the second load, and a second controller coupled to the second driver and configured to control the second driver, which second controller is further configured to receive a second position signal from a second position sensor, which second position signal is configured to define a second position of the second device, and which second controller is further configured to receive a second direction signal from a second direction sensor, and which second direction signal is configured to define a second direction of the second device;

wherein the second controller is configured to forward the second direction signal to an apparatus for distinguishing the first device and the second device from each other;

the second position sensor coupled to the second controller;

the second direction sensor coupled to the second controller; and wherein the apparatus for distinguishing the first device and the second device from each other by analyzing the first and second direction signal, wherein the first and second direction signals are different from each other.

8. The system as defined in claim 7, wherein the second direction sensor comprises a second light detector configured to detect the incoming light from the sun, which second light detector comprises a second multiple field light detector or another kind of second light detector.

9. The system as defined in claim 8, wherein the second direction sensor further comprises a second shadow producer configured to produce shadow on a part of the second light detector.

10. An apparatus configured to commission first and second devices and configured to distinguish the first and second devices from each other, which apparatus comprises a receiver configured to receive first position information from a first position sensor and configured to receive second position information from a second position sensor and configured to receive first direction information from a first direction sensor and configured to receive second direction information from a second direction sensor, which first position information is configured to define a first position of the first device, which second position information is configured to define a second position defining the position of the second device, which first direction information is configured to define a first direction of the first device, which second direction information is configured to define a second direction of the second device, and an analyzer configured to analyze the first and second direction information and first and second position for distinguishing first and second devices from each other.

* * * * *